(12) United States Patent
Kuo et al.

(10) Patent No.: US 6,403,170 B2
(45) Date of Patent: Jun. 11, 2002

(54) PROCESS FOR TEXTURING RECORDING MEDIA SUBSTRATES

(75) Inventors: David S. Kuo, Palo Alto; Li-Ping Wang; Wei H. Yao, both of Fremont, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/780,270

(22) Filed: Feb. 9, 2001

Related U.S. Application Data (62) Division of application No. 09/205,927, filed on Dec. 4, 1998, now Pat. No. 6,187,413.
(60) Provisional application No. 60/070,029, filed on Dec. 5, 1997.

(51) Int. Cl.[7] .............................. G11B 5/72; B23K 26/40
(52) U.S. Cl. ...................... 427/555; 427/122; 427/128; 427/129; 427/130
(58) Field of Search ................................ 427/555, 122, 427/128, 129, 130

(56) References Cited

U.S. PATENT DOCUMENTS

| | | | | |
|---|---|---|---|---|
| 5,576,918 A | * | 11/1996 | Bar-Gadda et al. ......... | 360/135 |
| 5,582,878 A | * | 12/1996 | Ogawa et al. .............. | 427/554 |
| 5,599,590 A | * | 2/1997 | Hayashi et al. ............. | 427/448 |
| 5,626,941 A | * | 5/1997 | Ouano ........................ | 428/141 |
| 5,723,033 A | * | 3/1998 | Weiss ..................... | 204/192.15 |
| 5,976,714 A | * | 11/1999 | Arita et al. ............ | 428/694 TR |
| 6,013,336 A | * | 1/2000 | Baumgart et al. .......... | 427/555 |
| 6,038,113 A | * | 3/2000 | Tanimoto et al. ........... | 360/135 |
| 6,103,404 A | * | 8/2000 | Ross et al. .................. | 428/680 |

\* cited by examiner

*Primary Examiner*—Stevan A. Resan
(74) *Attorney, Agent, or Firm*—Larkin, Hoffman, Daly & Lindgren, Ltd.; Frederick W. Niebuhr, Esq.

(57) ABSTRACT

A magnetic data storage medium includes a dedicated transducing head contact zone for engaging an air bearing slider, primarily when the disk is stationary and also during disk accelerations and decelerations. The contact zone has a dual baseline texture, formed by first creating a recessed region within the transducing head contact zone, and then by forming multiple nodules or other texturing features within the recessed region. The texturing features project upwardly from a recessed surface of the recessed region, and also project above an upper surface of the disk by an amount less than the texturing feature height. Consequently, the texturing features are large enough to counteract stiction due to liquid lubricant meniscus formation, yet also have heights sufficiently low relative to the upper surface to allow reduced transducer flying heights. According to a preferred texturing process, the recessed region consists of multiple individual recesses produced by applying a carbon layer to the disk, then forming cavities by selective laser ablation of the carbon layer.

25 Claims, 5 Drawing Sheets

PROCESS FOR TEXTURING RECORDING MEDIA SUBSTRATES

This is a Divisional of Application Ser. No. 09/205,927, filed Dec. 4, 1998 now U.S. Pat. No. 6,187,413.

This application claims the benefit of Provisional Application No. 60/070,029 entitled "Dual Baseline Texture for Guide/Stiction Performance Improvement," filed Dec. 5, 1997.

BACKGROUND OF THE INVENTION

The present invention relates to the texturing of magnetic data storage media, and more particularly to the texturing of dedicated transducing head contact zones (also called landing zones) of such media to reduce transducing head flying heights while also minimizing stiction.

Laser treated magnetic disks, particularly those textured over areas designed for contact with data transducing heads, are known to reduce friction and improve wear characteristics as compared to mechanically textured disks. Traditional laser texturing involves focusing a laser beam onto a disk substrate surface at multiple locations, forming at each location a depression surrounded by a raised rim as disclosed in U.S. Pat. No. 5,062,021 (Ranjan) and U.S. Pat. No. 5,108,781 (Ranjan). An alternative, as disclosed in International Publications No. WO 97/07931 and No. WO 97/43079, is to use a laser beam to form domes or nodules, rather than rims. In some cases, each of the domes is surrounded by a raised rim. The features can have either circular or elliptical profiles.

Collectively, the texturing features form a texture pattern or distribution throughout the head contact zone. A particularly preferred pattern is a spiral, formed by rotating the disk at a controlled angular speed while moving a laser radially with respect to the disk. The laser is pulsed to form the individual texturing features. The disk rotational speed and pulsing frequency together determine the circumferential pitch, i.e., the distance between adjacent texturing features in the spiral. Meanwhile, the radial speed of the laser controls the radial pitch or spacing between subsequent turns of the spiral. Frequently, the circumferential pitch and radial pitch are approximately the same, e.g., 20–30 microns. This spacing results in multiple texturing features cooperating to support a data transducing head at rest in the landing zone, given that the length and width dimensions of transducing head sliders typically are in the millimeter range.

The texturing features themselves can be made with a high degree of uniformity in size and shape, by maintaining a consistent laser power, focal spot size and pulse duration. As transducer glide heights (flying heights) continue to decrease, particularly below 1 microinch (25 nm), it becomes increasingly difficult for a texture to accommodate the glide height, and at the same time minimize stiction. The following table illustrates different measurements of three values, all in nm: an average height of multiple texturing features (Rp); the standard deviation of the height ($\sigma$); and the measured glide avalanche. Glide avalanche occurs when a measured signal output exceeds a certain threshold, indicating that the transducing head is flying "too close" to the surface.

TABLE

| Rp | $\sigma$ | Glide Avalanche |
|---|---|---|
| 15.2 | 1.4 | 18.8 |
| 15.5 | 1.2 | 18.2 |
| 18.0 | 1.6 | 18.8 |
| 18.7 | 1.1 | 21.1 |
| 19.7 | 1.8 | 24.6 |
| 19.8 | 1.6 | 25.8 |
| 23.0 | 1.5 | 30.5 |
| 23.6 | 1.5 | 27.0 |

From the table, it is seen that to avoid undue risk of collisions of the transducing head with the texturing features, while at the same time maintaining a flying height of about 25 nm, the average height of the features should be less than about 20 nm.

At the same time, the need to minimize friction and stiction imposes limits on the minimum heights of the texturing features. Typically, a liquid lubricant is applied to the surfaces of magnetic data storage disks, to improve wear characteristics and reduce dynamic friction. However, the liquid lubricant has the undesirable effect of contributing to stiction, the tendency of a data transducing head, once at rest against a magnetic disk, to adhere to the disk. This provides at least momentary resistance when the disk begins to rotate, potentially damaging both the disk and the transducing head, and risking loss of data.

Figure 1:
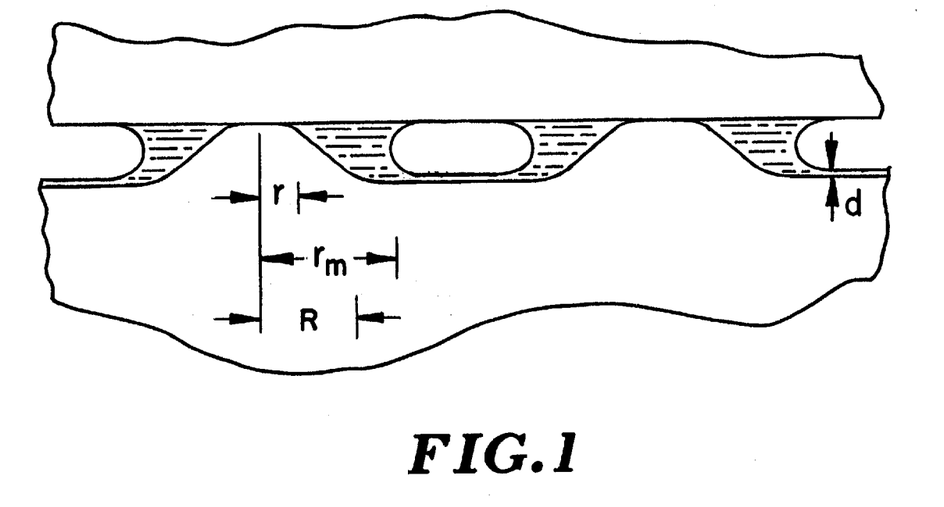
FIG. 1 is a schematic view showing part of a magnetic data transducing head at rest on a data storage disk, within a landing zone of the disk.

A primary cause of stiction is the tendency of the liquid lubricant, through capillary action, to flow about and surround the texturing features in contact with an at-rest transducing head, even flowing to the head itself as indicated in FIG. 1, where h indicates the height of a data transducing head when at rest upon the texturing features, two of which are shown The texturing features, nodules or bumps, are flattened slightly by the head over an area of contact with a radius r. By comparison, $r_m$ is the radius of the liquid lubricant meniscus surrounding each texturing feature, with each feature having a radius R at its base. The value d represents the thickness of the liquid lubricant film over surface areas away from the nodules. Thus, a meniscus of the liquid lubricant surrounds each texturing feature, occupying the full height between the transducing head and disk surface, clinging to the transducing head to provide momentary resistance to disk acceleration.

Figure 2:
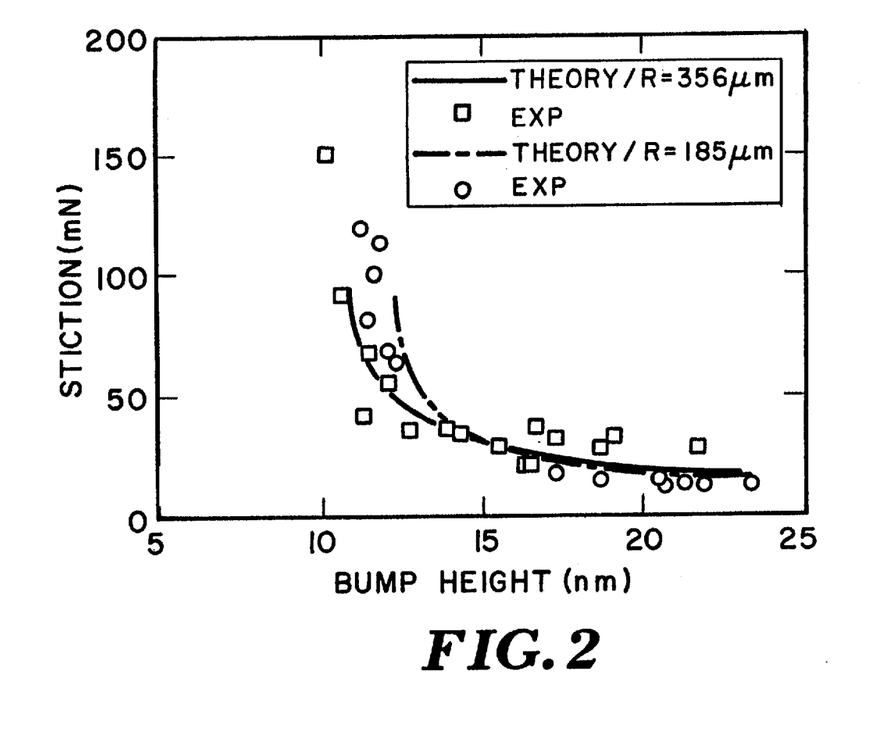
FIG. 2 is a chart showing stiction as a function of texturing feature height.

As seen in the chart of FIG. 2, the stiction effect increases dramatically as the height of texturing features decreases below 12 nm.

In view of the above, one option for achieving a 1 microinch glide height while minimizing stiction appears to be maintaining texturing feature heights within the range of 13–19 nm. However, given the lack of absolute precision in laser beam generation and optical components that focus and otherwise shape the laser beam, variance in substrate materials and parameters, and variance in the slider bodies that aerodynamically determine transducing head flying heights, the required degree of control is not practical. Further, when the heights of texturing features are reduced, their diameters are reduced as well, and it may be desirable to maintain larger diameter nodules or other features to enhance structural stability.

Therefore, it is an object of the present invention to provide a substrate for a data storage medium having a landing zone textured to accommodate glide heights less than 25 nm, while simultaneously minimizing stiction.

Another object is to provide a landing zone surface texture utilizing larger texturing features with greater heights, in combination with recessed regions surrounding the texturing features to accommodate liquid lubricant and thereby counteract the tendency of capillary flow toward a transducing head at rest on the landing zone.

A further object is to provide an improved process for texturing substrates and for fabricating magnetic data recording media to exhibit improved resistance to stiction despite lower transducing head flying heights.

Yet another object is to provide a data storage medium having improved wear characteristics and the tendency to afford increased longevity to data transducing heads used in conjunction with the medium.

SUMMARY OF THE INVENTION

To achieve these and other objects, there is provided a substrate for a data storage medium of the type including a data zone for storing data and a landing zone textured for contact with a data transducing head maintained in spaced apart relation to the data storage medium during use. The substrate includes a substrate body having a substantially planar substrate surface at least over a landing zone thereof. A recessed region is disposed within the landing zone, and has a substantially planar recessed surface spaced apart inwardly from the substrate surface by a predetermined distance substantially uniform throughout the landing zone. Multiple texturing features are formed in the recessed region and are projected outwardly from the recessed surface by a projection distance which exceeds the predetermined distance. Consequently, the texturing features project outwardly beyond the substrate surface of the substrate body.

This texture can be conveniently thought of as a "dual baseline" texture, in that it provides two separate baselines: one with regard to transducer flying height, and the other with regard to meniscus formation. In particular, the meniscus formation or "stiction" baseline is the recessed surface of the recessed region. To reach a transducing head at rest in the landing zone, a liquid lubricant would be required to traverse the height of each texturing feature, beginning at the base of the texturing feature, i.e., the recessed surface.

In contrast, the baseline for glide height or flying height is the geometric mean of the substrate surface and the recessed surface. By forming the recessed region as a small fraction of the landing zone, e.g., one-third of the surface area or less, the geometric mean is substantially nearer to the substrate surface. Accordingly, the texturing feature heights, as they relate to transducing head flying height, are effectively reduced by a fraction (preferably at least one-half, more preferably at least two-thirds) of the "predetermined distance" between the substrate surface and the recessed surface.

Thus, the benefits of reduced transducing head flying height and reduced stiction are simultaneously achieved, and in degrees that can vary according to design considerations. For example, by setting a projection distance, or texturing feature height above the recessed surface, at slightly more than 12 nm, stiction can be kept acceptably low while extremely low, sub-microinch flying heights are achieved. Alternatively, the texturing features can be formed to project beyond the substrate surface by slightly less than 20 nm, to maintain an acceptably low flying height while considerably diminishing the chance for stiction due to meniscus formation.

Preferably, the "predetermined distance" or separation between the substrate surface and recessed surface is at least about 5 nm, and more preferably is in the range of about 5 to about 10 nm.

To further ensure against meniscus formation, there should be a clearance between each of the texturing features and the nearest edge of the recessed region, as measured in directions parallel to the substrate and recessed surfaces. The clearance should be at least 3 nm, and more preferably is about 5 nm or more.

Another aspect of the present invention is a process for selectively texturing a recording medium substrate, including the following steps:

a. providing a substrate body having a substantially planar substrate surface;

b. applying a material layer over the substrate surface at a substantially uniform thickness, whereby an outer surface of the material layer is substantially planar and parallel to the substrate surface;

c. selectively removing portions of the material from the material layer within a predetermined zone thereof, to provide a selected region with a recessed surface disposed inwardly of the outer surface of the material layer; and d. forming multiple texturing features throughout the selected region, each texturing feature projecting outwardly away from the recessed surface and beyond the outer surface of the material layer.

A preferred material is carbon, applied by vacuum deposition to a thickness of about 5–10 nm. Then, a laser (e.g., a $CO_2$ laser) is used to remove the carbon at selected locations or spots. Preferably, the laser ablation removes the carbon throughout the thickness of the carbon layer, thus leaving the substrate body, e.g., a glass ceramic, exposed. As a result, the thickness of the carbon layer provides the uniform separation distance between the substrate surface and the outer surface. Then, another laser (e.g., a YAG laser) is directed onto the exposed substrate surface areas to form the texturing features, preferably in a one-to-one correspondence to the areas of carbon removal, and preferably with the texturing feature centered within its associated carbon-depleted spot or location.

At this stage, texturing of the landing zone is complete. As an option, that portion of the carbon layer spanning the data zone of the disk is removed.

Next, post-texturing steps of disk fabrication are completed. These include the application of several further layers to the textured substrate including the data zone and landing zone. These layers include a chromium underlayer, a thin film magnetic recording layer, and a protective cover layer, typically carbon. These subsequent layers are applied by vacuum deposition and in substantially uniform thicknesses, such that the outer surface of the protective carbon layer replicates the topography of the textured substrate.

Thus, in accordance with the present invention, the landing zone of a data storage medium substrate is provided with separate, spaced apart baselines with respect to transducer flying height and stiction. The separate baselines are provided by forming a recessed region within the landing zone, and forming texturing features only within the recessed region. Consequently, the features can have actual heights, with respect to the stiction baseline, sufficient to minimize stiction due to meniscus formation, yet also have effective heights, with respect to the non-recessed substrate surface, sufficiently small to accommodate sub-microinch transducer flying heights.

IN THE DRAWINGS

For a further appreciation of the above and other features and advantages, reference is made to the following detailed description and to the drawings, in which.

DETAILED DESCRIPTION OF THE PREFERRED EMBODIMENTS

Figure 3:
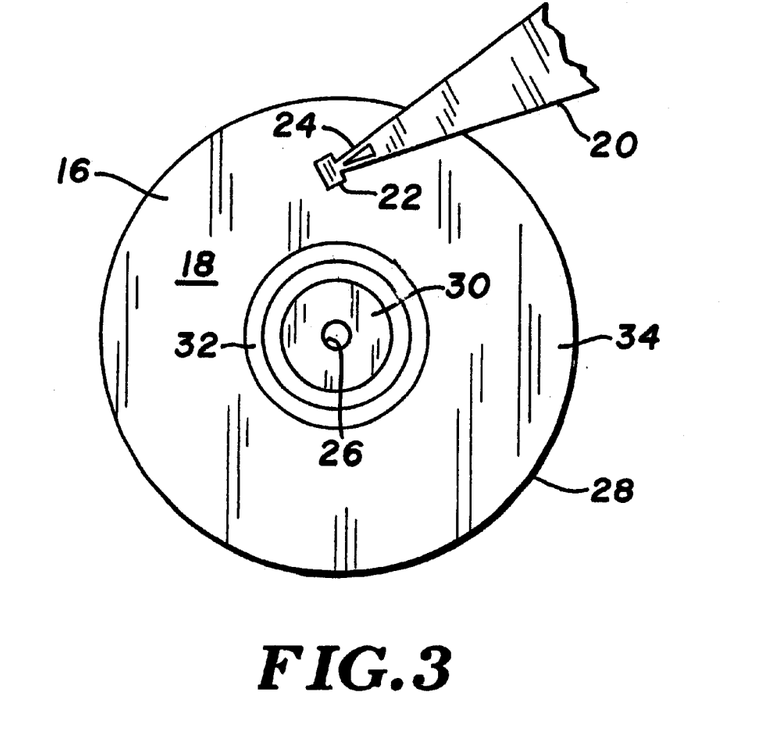
FIG. 3 is a plan view of a magnetic data storage disk textured in accordance with the present invention, and a data transducing head supported for generally radial movement relative to the disk.
Figure 4:
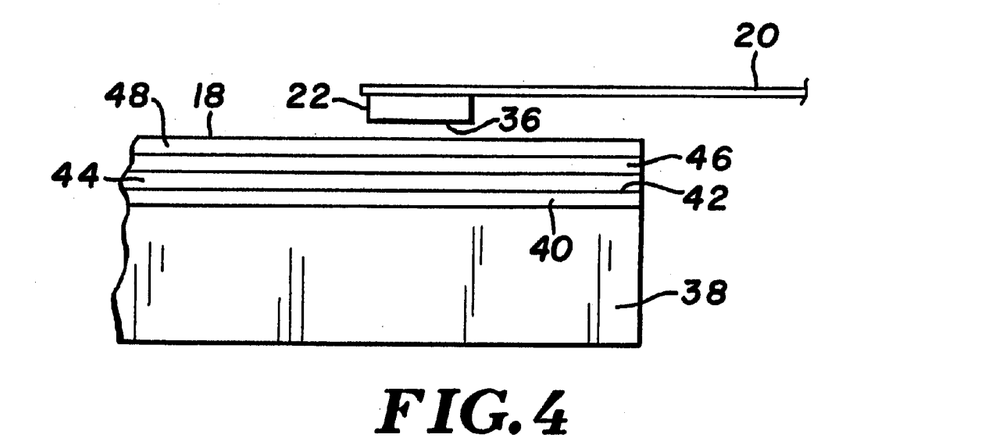
FIG. 4 is an enlarged partial sectional view of the magnetic disk in FIG. 3.

Turning now to the drawings, there is shown in FIGS. 3 and 4 a medium for reading and recording magnetic data, in particular a magnetic disk 16 rotatable about a vertical axis and having a substantially planar horizontal upper surface 18. A rotary actuator (not shown) carries a transducing head support aim 20 in cantilevered fashion. A magnetic data transducing head 22 (including magnetic transducer and air bearing slider) is mounted to the free end of the support arm, through a suspension 24 which allows gimballing action of the head, i.e., limited vertical travel and rotation about pitch and roll axes. The rotary actuator and the support arm pivot to move head 22 in an arcuate path, generally radially with respect to the disk.

At the center of disk 22 is an opening to accommodate a disk drive spindle 26 used to rotate the disk. Between the opening and an outer circumferential edge 28 of the disk, upper surface 18 is divided into three annular regions or zones: a radially inward zone 30 used for clamping the disk to the spindle; a dedicated transducing head contact zone 32; and a data storage zone 34 that serves as the area for recording and reading the magnetic data.

When the disk is at rest, or rotating at a speed substantially below its normal operating range, head 22 contacts upper surface 18. When the disk rotates at higher speeds, including normal operating range, an air bearing or cushion is formed by air flowing between the head and upper surface 18 in the direction of disk rotation. The air bearing supports the head above the upper surface. In accordance with this invention, the distance between a planar bottom surface 36 of head 22 and upper surface 18, known as the head flying height or glide height, is about 1 microinch (25.4 nm) or even less. Lower flying heights permit a higher density storage of data.

For data recording and reading operations, rotation of the disk and pivoting of the support arm are controlled in concert to selectively position transducing head 22 near desired locations within data zone 34. Following a data operation, the disk is decelerated and support arm 20 is moved radially inward toward contact zone 32. By the time the disk decelerates sufficiently to allow head/disk contact, the head is positioned over the contact zone. Thus, head contact with other regions of the disk surface is avoided. Before the next data operation, the disk is accelerated, initially with head 22 engaged with disk 16 within the contact zone. Support arm 20 is not pivoted until the head is supported by an air bearing, above the contact zone.

Magnetic disk 16 is formed by mechanically finishing an aluminum or glass ceramic substrate disk 38 to provide a substantially flat upper surface. Typically in the case of A1 substrates, a nickel-phosphorous alloy has been plated onto the upper surface of the substrate disk, to provide a non-magnetizable layer 40 with a uniform thickness in the range of about 2–12 microns. Following plating, the exposed upper surface 42 of the Ni—P alloy layer is polished to a roughness of about 0.1 microinch (2.54 nm) or less.

After mechanical finishing, substrate surface 42, at least along contact zone 32, is laser textured to provide a desired surface roughness. Laser texturing involves melting the substrate disk at and near surface 42, forming texturing features as will be described in greater detail below.

Fabrication of disk 16 involves the application of several layers after texturing. The first of these is a chrome underlayer 44 with a typical thickness of about 10–100 nm. Next is a magnetic thin film recording layer 46, where the data are stored, typically at a thickness of about 10–50 nm. The final layer is a protective carbon layer 48, in the range of 5–30 nm in thickness. Layers 44, 46 and 48 are substantially uniform in thickness, and thus upper surface 18 replicates the texture of substrate surface 42.

Laser texturing involves forming discrete nodules (also called bumps or domes), or crater-like structures in the form of depressions surrounded by raised, rounded rims that are typically circular but can be elliptical, in the substrate disk at surface 42. The size of the texturing features depends on the level of laser beam energy impinging upon surface 42, the degree of focusing of the laser beam, and the duration or dwell time of the pulse during which the energy is applied. Typically the nodules are formed in a spiral path, having a circumferential pitch governed by the disk rotational speed and laser pulsing interval during texturing. A radial pitch, i.e., the radial distance between consecutive turns of the spiral path, is determined by disk rotation and the rate of radial shifting of the laser relative to the disk, which can involve movement of the disk rather than the laser. The texturing features can be formed with a high degree of uniformity in height (distance between the nodule or rim peak and the surface on which the feature is formed) typically less than about 30 nm. This provides a uniform surface roughness, substantially throughout the contact zone.

Figure 5:
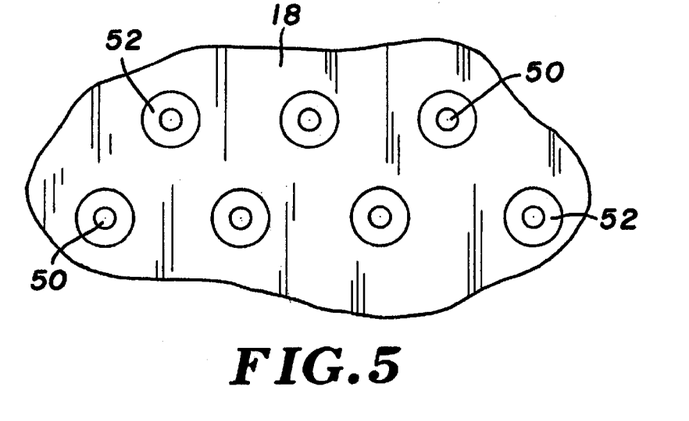
FIG. 5 is an enlarged partial top view of the disk, showing part of a dedicated landing zone of the disk.

FIG. 5 is an enlarged view of part of upper surface 18 of disk 16, particularly within contact zone 32. A roughness or texture is provided by multiple nodules 50, spaced apart from one another according to a predetermined circumferential and radial pitch as just discussed. Nodules 50 do not project upwardly (or outwardly) directly from upper surface 18, however. Rather, each nodule 50 is formed within a cavity or depression 52, preferably at least approximately centered within its associated cavity. Typically, cavities 52 can have a diameter of about 20 microns, while the nodules have diameters of about 8–10 nm.

A variety of cavity diameters and nodule diameters can be employed, and each nodule need not be precisely centered within its associated cavity.

Figure 6:
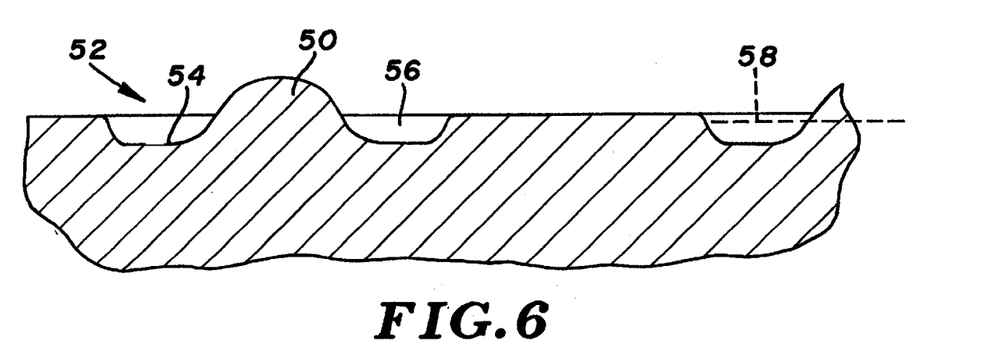
FIG. 6 is a partial side sectional view of the disk, taken in the landing zone.

As best seen in FIG. 6, nodule 50 is projected above or outwardly of the major plane of upper surface 18, so that multiple nodules in concert support data transducing head 22 in spaced apart relation to most of surface 18 when head 22 is at rest in the contact zone. Also as shown in this figure, each cavity 52 has a floor or recessed surface 54 spaced apart inwardly from upper surface 18, and a generally upright peripheral wall 56. Nodule 50 need not be precisely centered within cavity 52. At the same time, the clearance between nodule 50 and peripheral wall 56, taken horizontally as viewed in FIG. 6, should be at least about 3 nm, and more preferably is at least 5 nm. The clearance is provided to accommodate the liquid lubricant, in particular to counteract the tendency of the lubricant to form a meniscus about nodule 50 that proceeds toward transducing head 22 when the head is at rest upon nodules 50.

The primary difference between the texture of contact zone 32 and previous textures is that nodules 50 project upwardly from recessed surfaces 54 rather than from upper surface 18. Consequently, the texture provides two spaced apart baselines, that in previous designs coincide. In particular, each recessed surface 54 determines a stiction (or meniscus formation) baseline with respect to its associated nodule 50. The flying height baseline is determined by upper surface 18 in cooperation with recessed surfaces 54. More precisely, the flying height baseline is the geometric mean of surfaces 18 and 54. Because the primary advantages of the invention arise from the vertical separation between the two baselines, it is preferred that the flying height baseline be determined primarily by upper surface 18. Such is the case when a recessed region, composed of all cavities 52 within the contact zone, occupies less than half of the contact zone surface, and more preferably occupies less than one-third of the contact zone surface. A result of the latter case is shown by a broken line 58 indicating the flying height baseline.

The dual baseline texture permits the use of nodules or other texturing features with heights sufficient to minimize or avoid stiction due to liquid lubricant meniscus formation, and simultaneously allows for sub-microinch transducer flying heights. Either of these advantages may be emphasized relative to the other. With reference to the foregoing discussion of minimum texturing feature heights necessary to avoid meniscus formation, nodules 50 could have heights slightly greater than 12 nm, for example in the range of 15–18 nm. Assuming a vertical distance of 5 nm between surfaces 18 and 54, the nodules would project beyond surface 18 by distances of 10–13 nm, easily accommodating sub-microinch transducer flying heights, especially if the flying height baseline substantially coincides with upper surface 18. Conversely, if a flying height of about 1 microinch is satisfactory and the primary goal is to virtually eliminate stiction due to meniscus formation, nodules with heights in the range of 20–23 nm are formed. Again assuming 5 nm between surfaces 18 and 54, the nodules project above surface 18 by distances in the range of 15–18 nm.

More broadly, the texturing features project outwardly beyond surface 18 by less than about 20 nm. At the other end of the scale, the nodules preferably project outwardly from surfaces 54 by more than 12 nm. These constraints afford considerable variety, particularly in view of the options to provide different separation distances between surfaces 18 and 54, and to provide different proportions of contact zone surface area occupied by the recessed region.

Figure 7:
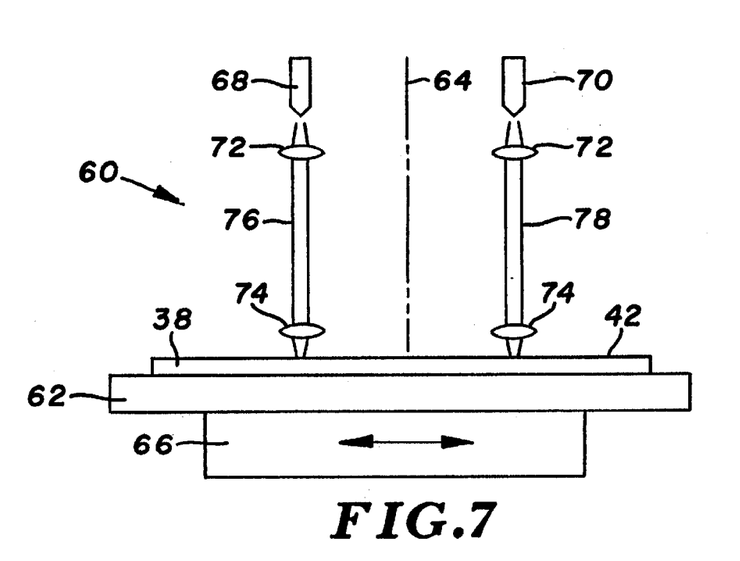
FIG. 7 is a schematic illustration of an apparatus used to texture the landing zone.

FIG. 7 schematically illustrates a laser texturing apparatus 60 used to form dual baseline textures in magnetic media substrates such as substrate disk 38. The device includes a support stage 62 that rotates about a vertical axis 64, and a reciprocating support stage 66 on which support stage 62 is rotatably mounted.

Two lasers, both stationary, are disposed above disk 38 and the support stages: a $CO_2$ laser 68 and a YAG laser 70. Respective beam shaping optics are associated with the lasers, including collimating lenses 72 and focusing lenses 74 for bringing the laser beams, indicated at 76 and 78 respectively, into focus at desired locations on substrate surface 42 of disk 38.

Figure 8:
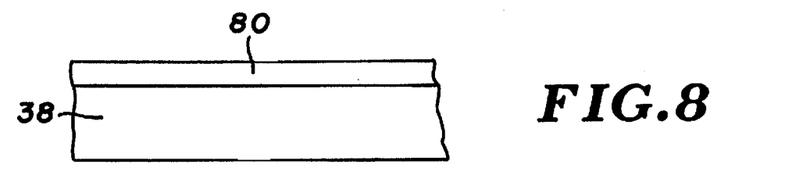
FIG. 8 is a schematic side view showing part of a substrate, before texturing.

In one particularly preferred fabrication approach, a glass ceramic substrate disk 38 is first treated in a vacuum deposition process in which a uniformly thick carbon layer is applied onto surface 42. The preferred thickness of the carbon layer is at least about 5 nm, more preferably in the range of 5–10 nm. The result of the carbon deposition is a carbon layer 80 of the preferred thickness, shown in FIG. 8.

Figure 9:
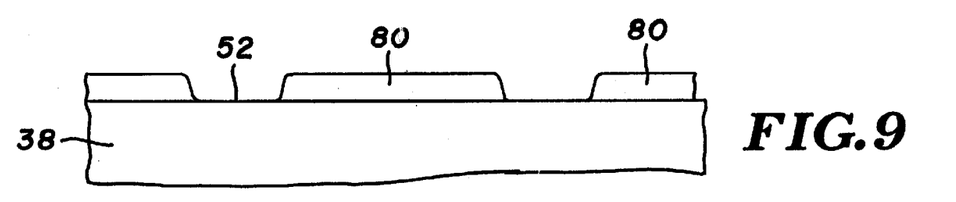
FIG. 9 is a view similar to that of FIG. 8, showing part of a carbon coating removed.
Figure 10:
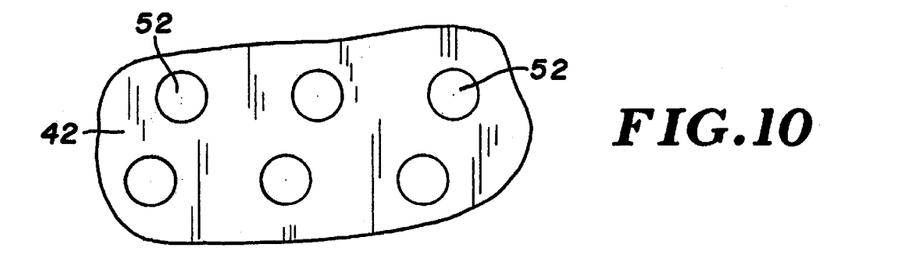
FIG. 10 is a partial top view of the substrate shown in FIG. 9.

The coated disk then is placed on rotatable support stage 62, centered on axis 64. Then, while stage 62 is rotated to achieve a desired circumferential speed, support stage 66 is translated to provide the desired radial velocity. The $CO_2$ laser 68 generates beam 76 at a wavelength with a high affinity for absorption by carbon. As a result, energy applied to carbon layer 80 at a particular spot or location remains largely confined to that location and extends through the thickness of the layer. As a result, material is removed to leave a generally circular cavity extending completely through the carbon layer to surface 42. Thus, surface 42 becomes the recessed surface 54 in each of the cavities. The result of the $CO_2$ laser treatment is shown in FIGS. 9 and 10. Thus, the $CO_2$ laser is used to create a recessed region composed of multiple cavities 52.

Figure 11:
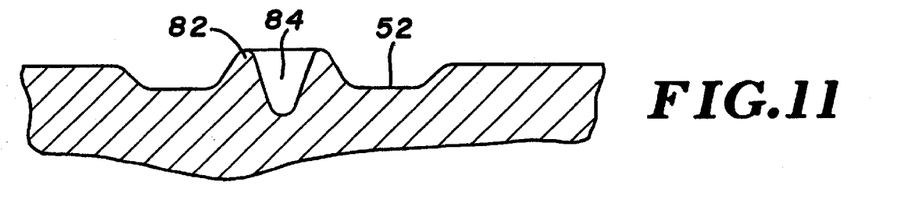
FIG. 11 is a partial side view of the substrate, similar to that in FIG. 9, after formation of a texturing feature.

After the cavities have been formed, the substrate disk is given a second laser treatment, this time using YAG laser 70. The translation parameters (rotation and radial translation) of the $CO_2$ laser treatment stage are repeated, so that a single texturing feature is formed within each of cavities 52. The result is shown in FIG. 11. Also shown in FIG. 11 is a texturing feature in the form of a generally circular, rounded rim 82 surrounding a depression 84. This crater-like texturing feature is frequently formed as an alternative to the rounded nodules or bumps, with the laser power and degree of focus largely influencing the shape of the texturing feature.

Figure 12:
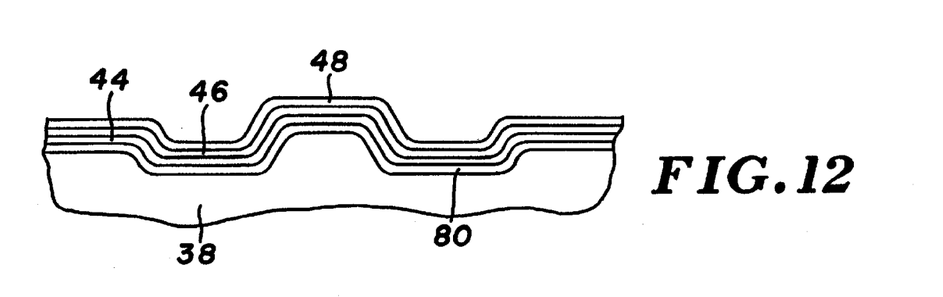
FIG. 12 illustrates post-texturing fabrication stages.

After texturing, a series of vacuum deposition stages are completed to form several layers on the substrate disk, including chrome underlayer 44, thin film recording layer 46, and protective carbon layer 48. The result is shown in FIG. 12.

Figure 13:
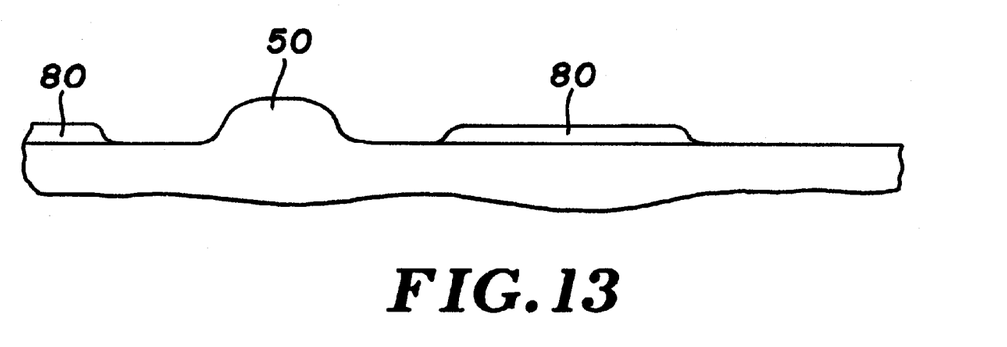
FIG. 13 schematically illustrates an alternative embodiment process step.

In the foregoing fabrication process, carbon layer 80 is applied over the entire disk, covering both data zone 34 and contact zone 32. According to an alternative embodiment process, that portion of carbon layer 80 covering the data zone can be removed, e.g. by a masking and etching stage, leaving the substrate surface in the data zone exposed as indicated in FIG. 13.

Figure 14:
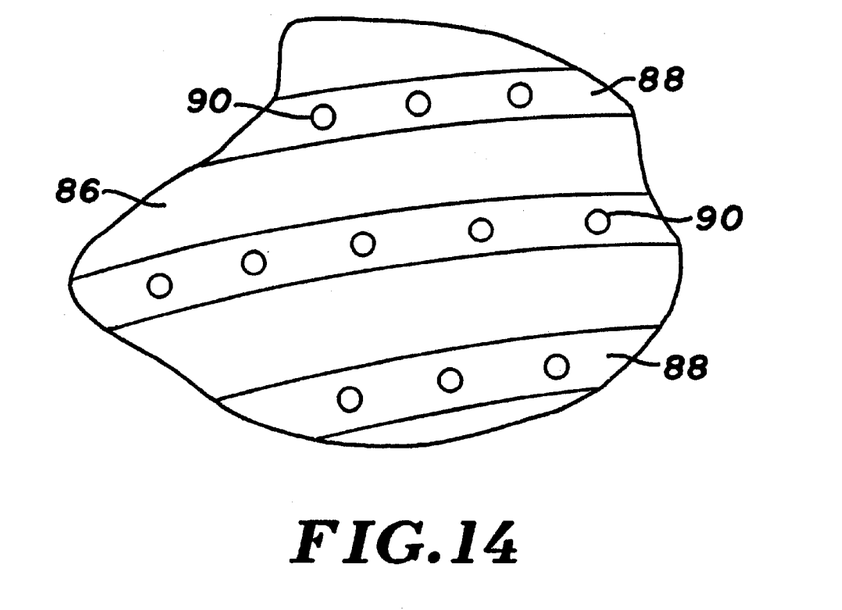
FIG. 14 is a partial top view of a substrate textured according to an alternative embodiment approach.

FIG. 14 illustrates an alternative embodiment substrate disk 86, particularly its contact zone. In disk 86, the recessed region is provided in the form of a single spiral groove 88, formed by operating $CO_2$ laser 68 in a continuous wave (CW) mode rather than a pulsed mode, or in the alternative rotating the disk just slightly between successive pulses. An advantage of this approach is that less precision is required in the subsequent laser treatment stage that forms texturing features 90. A disadvantage is the need to remove a substantially greater percentage of the carbon layer.

Thus, in accordance with the present invention, substrates can be textured to accommodate glide heights of less than a microinch, and not only avoid increasing stiction, but further minimize stiction due to meniscus formation. Nodules and other texturing features that otherwise would be too large for a desired glide height, can be used successfully in the dual baseline texture. Accordingly, lower glide heights and improved resistance to stiction can be simultaneously achieved.

What is claimed is:

1. A process for selectively texturing a recording medium substrate, including:

providing a substrate body having a substantially planar substrate surface;

applying a material layer over the substrate surface at a substantially uniform thickness, whereby an outer surface of the material layer is substantially planar and parallel to the substrate surface;

selectively removing portions of the material from the material layer within a predetermined zone thereof, to provide a selected region with a recessed surface disposed inwardly of the outer surface of the material layer; and forming multiple texturing features throughout the selected region, each texturing feature projecting outwardly away from the recessed surface and beyond the outer surface of the material layer.

2. The process of claim 1 wherein:

the step of applying a material layer comprises applying carbon by vacuum deposition, to a thickness from about 5 nm to about 10 nm.

3. The process of claim 2 further including:

after forming the multiple texturing features, applying a magnetic thin film recording layer over the outer surface of the material layer at a substantially uniform thickness whereby the thin film recording layer substantially replicates a topography of the underlying substrate and material layer.

4. The process of claim 3 further including:

removing a portion of the carbon layer adjacent to a data zone, before applying the magnetic thin film recording layer.

5. The process of claim 2 wherein:

said removing portions of the material layer comprises directing a coherent energy beam toward the material layer and causing the coherent energy beam to impinge upon the outer surface at a plurality of selected locations thereon, thus to remove material at each of the selected locations.

6. The process of claim 5 wherein:

the material, at each of the selected locations, is removed over the full thickness of the material layer, whereby the recessed surface and the substrate surface coincide.

7. The process of claim 5 wherein:

said forming nultiple texturing features comprises directing a coherent energy beam toward the substrate body at each of the selected locations after the removal of the material at the selected locations, to alter the surface topography at each of the selected locations to form a texturing feature.

8. The process of claim 5 wherein:

said removal of portions of the material from the material layer comprises forming a plurality of recesses, one recess at each of the selected locations, and said forming multiple texturing features comprises forming one of the texturing features in each of the process.

9. The process of claim 8 wherein:

each of the recesses is at least generally circular, and forming multiple texturing features further comprises substantially centering each of the features within its associated recess.

10. The process of claim 1 wherein:

said forming multiple texturing features comprises directing a coherent energy beam toward the magnetic medium substrate and causing the coherent energy beam to impinge upon the substrate surface at a plurality of selected locations thereon, altering the topography of the surface at each selected location to form a texturing feature.

11. A process for texturing a dedicated transducing head contact zone of a data storage medium, including:

providing a data storage substrate having a substantially planar outer surface;

selectively removing material from the data storage substrate near the outer surface, to provide at least one recessed surface disposed inwardly of the outer surface; and forming a plurality of texturing features along the recessed region, each texturing feature projecting outwardly away from the recessed surface and beyond the outer surface of the data storage substrate.

12. The process of claim 11 wherein:

said selectively removing material from the data storage substrate comprises forming a plurality of recesses extending inwardly from the outer surface and together providing the recessed region; and said forming a plurality of texturing features comprises forming the texturing features in said recesses.

13. The process of claim 12 wherein:

said forming a plurality of texturing features comprises forming one of the texturing features in each recess.

14. The process of claim 12 wherein:

said forming a plurality of recesses comprises forming the recesses with respective substantially planar bottom surfaces and with substantially uniform depths, whereby the bottom surfaces substantially occupy a common plane parallel to the outer surface.

15. The process of claim 12 wherein:

the recesses are at least generally circular, and said forming a plurality of texturing features comprises substantially centering each of the texturing features within an associated one of the recesses.

16. The process of claim 12 wherein:

said forming a plurality of recesses comprising forming each recess with a depth, inwardly of the outer surface, of at least 5 nm.

17. The process of claim 16 wherein:

said forming a plurality of texturing features comprises forming each of the features with a height that exceeds the depth of its associated recess by about 12 to 20 nm.

18. The process of claim 11 further including:

after forming the plurality of texturing features, applying a magnetic thin film recording layer over the outer surface and the recessed region at a substantially uniform thickness whereby the thin film recording layer substantially replicates a topography of the underlying data storage substrate.

19. The process of claim 11 wherein:

said providing the data storage substrate comprises applying a material layer over a substrate body whereby the material layer defines said outer surface; and said selectively removing material from the data storage substrate comprises selectively removing material from the material layer.

20. The process of claim 19 wherein:

said applying a material layer comprises applying carbon by vacuun deposition, to a thickness ranging from about 5 nm to about 10 nm.

21. The process of claim 20 wherein:

said selectively removing material from the material layer comprises directing a coherent energy beam toward the material layer and causing the coherent energy beam to impinge upon the outer surface at a plurality of selected locations thereon, thus to remove material at each of the selected locations.

22. The process of claim 21 wherein:

the material at each of the selected locations is removed substantially over the full thickness of the material layer.

23. The process of claim 19 further including:

after forming the plurality of texturing features, applying a magnetic thin film recording layer over the outer surface of the material layer at a substantially uniform thickness whereby the thin film recording layer substantially replicates a topography of the underlying substrate and material layer.

24. The process of claim 11 wherein:

said selectively removing material from the data storage substrate comprises directing a first coherent energy beam toward the substrate and causing the first coherent energy beam to impinge upon the outer surface at a plurality of selected locations thereon, thus to remove a portion of the substrate at each of the selected locations.

25. The process of claim 24 wherein:

said forming a plurality of texturing features comprises directing a second coherent energy beam toward the data storage medium substrate and causing the second coherent energy beam to impinge upon the substrate at said selected locations, altering the surface topography at each selected location to form one of the texturing features.

* * * * *